L. E. PLAMONDON.
MECHANICAL MOVEMENT.
APPLICATION FILED APR. 7, 1915.
1,159,601.
Patented Nov. 9, 1915.
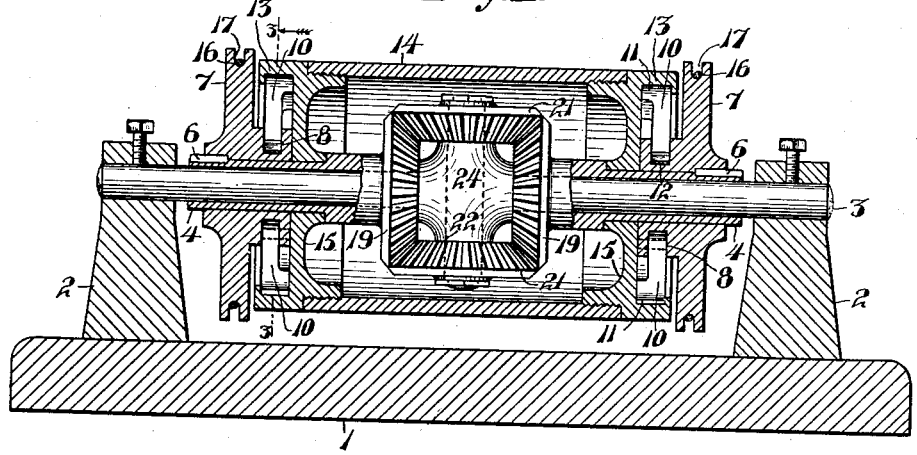
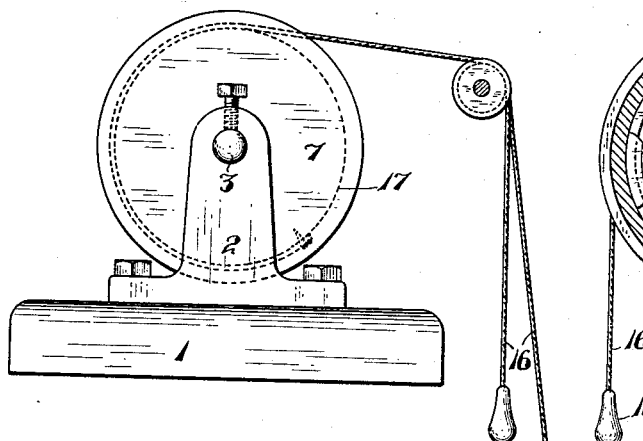
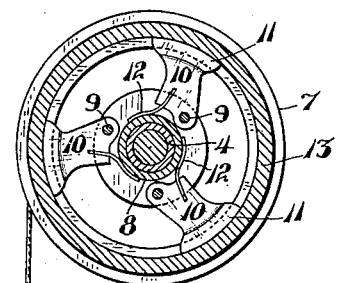
INVENTOR,
Louis E. Plamondon
BY
ATTORNEY

UNITED STATES PATENT OFFICE.

LOUIS E. PLAMONDON, OF SANTA ROSA, CALIFORNIA.

MECHANICAL MOVEMENT.

1,159,601. Specification of Letters Patent. Patented Nov. 9, 1915.

Application filed April 7, 1915. Serial No. 19,704.

*To all whom it may concern:*

Be it known that I, LOUIS E. PLAMONDON, a citizen of the United States, residing at Santa Rosa, in the county of Sonoma and State of California, have invented new and useful Improvements in Mechanical Movements, of which the following is a specification.

The object of the present invention is to provide a simple, economical, efficient and reliable means for obtaining a continuous rotary motion of one element from the alternate reciprocating motions of two other elements.

My invention may be used advantageously whatever be the nature of the elements which thus reciprocate alternately, whether they be moved by hand, or by foot, or by reciprocating pistons or plungers, or by elements of any character whatever, and since the nature of the reciprocating element will obviously not affect the movement, I deem it unnecessary to give more than one example thereof.

In the accompanying drawing, Figure 1 is a longitudinal sectional view of my improved mechanical movement; Fig. 2 is a side view thereof; Fig. 3 is a detail transverse section on the line 3—3 of Fig. 1.

Referring to the drawing, on a suitable base 1 are erected uprights 2, to which is secured a fixed shaft 3, around which are sleeves 4. Keyed to said sleeves 4, as shown at 6, are pulleys 7 having hubs with circumferential grooves 8, in which are pivotally mounted, as shown at 9, the inner ends of arms 10, extending at a slight deviation from a radial direction, their outer ends being extended to form friction shoes 11, which are, by means of springs 12, normally pressed outwardly into frictional engagement with the inner surfaces of flanges 13 of rings 15 which rotate on the sleeves 4 and are screwed into the ends of a cylinder 14. Cords 16 are secured to said pulleys and are contained in grooves 17 therein, their outer ends being attached to handles 18. The sleeves 4 have formed on their inner ends miter gears 19, which mesh with miter gears 21 rotatable around a shaft 22 extending transversely to the shaft 3, and passing through a circular enlargement 24 thereof.

The following is the mode of operation of my improved mechanical movement. Supposing that the right hand is used to turn the corresponding pulley 7, then, on account of the frictional engagement of the inner surface of the right-hand flange 13 with the corresponding shoes 11, which are continuously pressed against said flange by the springs 12, said shoes will be caused to bind still more tightly against the flange, the hub of the pulley and the arms 10 acting as toggle levers, which tend to be straightened out by the rotary motion of said hub. On account of the great friction developed between the shoes 11 and the right-hand flange 13, said rotary motion will be imparted to the corresponding ring 15, and therefore also to the cylinder 14. At the same time, the right-hand sleeve 6, rotating with the pulley 7, will, by means of the miter gears 19 and 21, impart a rotary motion in the opposite direction to the left-hand sleeve 6, and therefore move the left-hand pulley in the direction to move the arms 10 still farther away from the radial direction, so that the shoes 11 are withdrawn from the left-hand flange 13, and the left-hand sleeve, rotating in the opposite direction to the right-hand sleeve, withdraws the left-hand handle into its initial position in which it is again ready for doing effective work. It is obvious that the operation of the left-hand handle, will, in like manner as for the right-hand handle, rotate the cylinder in the same direction as before, at the same time withdrawing the right-hand handle to its initial position. The cylinder may be equipped with any means desired for transmitting to any other desired element this rotary motion in a uniform direction.

I claim :—

1. In combination, a stationary shaft, sleeves thereon, pulleys keyed to said sleeves, means for oscillating said pulleys, arms pivotally attached to said pulleys, a rotary device surrounding said shaft and having portions the inner surfaces of which can frictionally engage said arms, springs for pressing said arm against said surfaces, bevel gears on the inner ends of said sleeves, a shaft extending transversely through said stationary shaft, and bevel gears on the ends of said latter shaft and meshing with the first-named bevel gears.

2. In combination, a stationary shaft having a central enlargement, sleeves thereon, pulleys keyed to said sleeves, means for oscillating said pulleys, arms pivotally attached to said pulleys, a rotary device surrounding said shaft and having portions the inner surfaces of which can frictionally engage said arms, springs for pressing said arms against said surfaces, bevel gears on the inner ends of said sleeves, a shaft extending transversely through said enlargement, and bevel gears on the ends of said latter shaft and meshing with the first-named bevel gears.

In testimony whereof I have hereunto set my hand in the presence of two subscribing witnesses.

LOUIS E. PLAMONDON.

Witnesses:
THORN P. GALE,
JANET STOKES.

Copies of this patent may be obtained for five cents each, by addressing the "Commissioner of Patents, Washington, D. C."